(12) United States Patent
Wang et al.

(10) Patent No.: US 12,017,939 B2
(45) Date of Patent: Jun. 25, 2024

(54) OILY SEWAGE PRETREATMENT METHOD AND DEVICE WITHOUT AIR FLOATATION

(71) Applicants: Shanghai Huachang Environmental Protection Co., Ltd, Shanghai (CN); Sichuan University, Sichuan (CN); East China University of Science and Technology, Shanghai (CN)

(72) Inventors: Hualin Wang, Shanghai (CN); Yuxiao Sun, Shanghai (CN); Jiandong Hu, Guangdong (CN); Yi Liu, Shanghai (CN); Huiqing Yu, Zhejiang (CN); Haiyang Bai, Zhejiang (CN); Bichuan Yu, Zhejiang (CN); Dun Wang, Zhejiang (CN); Xia Jiang, Sichuan (CN); Zhishan Bai, Shanghai (CN); Qiang Yang, Shanghai (CN); Jianqi Chen, Shanghai (CN); Wei Yuan, Shanghai (CN); Qisong Shen, Shanghai (CN)

(73) Assignees: Shanghai Huachang Environmental Protection Co., Ltd., Shanghai (CN); Sichuan University, Sichuan (CN); East China University of Science and Technology, Shanghai (CN)

( * ) Notice: Subject to any disclaimer, the term of this patent is extended or adjusted under 35 U.S.C. 154(b) by 534 days.

(21) Appl. No.: 17/293,730

(22) PCT Filed: Mar. 19, 2019

(86) PCT No.: PCT/CN2019/078618
§ 371 (c)(1),
(2) Date: May 13, 2021

(87) PCT Pub. No.: WO2020/098193
PCT Pub. Date: May 22, 2020

(65) Prior Publication Data
US 2022/0009811 A1    Jan. 13, 2022

(30) Foreign Application Priority Data

Nov. 13, 2018    (CN) .......................... 201811347039.5

(51) Int. Cl.
*C02F 9/00* (2023.01)
*B01D 17/04* (2006.01)
(Continued)

(52) U.S. Cl.
CPC .............. *C02F 9/00* (2013.01); *B01D 17/045* (2013.01); *B04C 9/00* (2013.01); *C02F 1/38* (2013.01);
(Continued)

(58) Field of Classification Search
CPC .......... C02F 1/40; C02F 2101/32; C02F 1/38; C02F 3/30; B01D 17/02; B01D 17/045; B01D 24/46; B01D 24/4689
(Continued)

(56) References Cited

U.S. PATENT DOCUMENTS

| | | | |
|---|---|---|---|
| 5,762,810 A | 6/1998 | Pelton et al. | |
| 2012/0132588 A1 | 5/2012 | Yu et al. | |
| 2017/0088441 A1* | 3/2017 | Yang | ......................... C02F 1/40 |

FOREIGN PATENT DOCUMENTS

| | | | |
|---|---|---|---|
| CN | 2609631 Y | * | 4/2004 |
| CN | 101638274 A | * | 2/2010 |

(Continued)

OTHER PUBLICATIONS

Wang et al, CN 101638274A, English machine translation, pp. 1-8 (Year: 2010).*
(Continued)

*Primary Examiner* — Claire A Norris
(74) *Attorney, Agent, or Firm* — Melissa Hunter-Ensor; Nathan Hsu; Greenberg Traurig, LLP

(57) ABSTRACT

An oily sewage pretreatment method without air flotation, comprising the following steps: (a) sedimentation separa-
(Continued)

tion: performing sedimentation separation on oily sewage to implement preliminary separation of oil, sludge, and water; (b) boiling bed separation: performing boiling bed separation on the oily sewage obtained by the preliminary separation to further remove dispersed oil, sludge, and sand from the oily sewage; (c) shape coalescence separation: performing shape coalescence separation on the oily sewage obtained by the boiling bed separation in step (b) to implement demulsification, coalescence, and separation of emulsified oil; and (d) biochemical treatment: the effluent obtained in step (c) directly enters an AOH biochemical system, an air flotation unit is omitted. Also disclosed is an oily sewage pretreatment apparatus without air flotation.

10 Claims, 1 Drawing Sheet

(51) Int. Cl.
*B04C 9/00* (2006.01)
*C02F 1/00* (2023.01)
*C02F 1/38* (2023.01)
*C02F 1/40* (2023.01)
*C02F 3/30* (2023.01)
C02F 101/32 (2006.01)
C02F 103/36 (2006.01)

(52) U.S. Cl.
CPC .................. *C02F 1/40* (2013.01); *C02F 3/30* (2013.01); *B04C 2009/004* (2013.01); *C02F 2001/007* (2013.01); *C02F 2101/32* (2013.01); *C02F 2103/365* (2013.01); *C02F 2303/16* (2013.01)

(58) Field of Classification Search
USPC .................................... 210/708, 799, DIG. 5
See application file for complete search history.

(56) References Cited

FOREIGN PATENT DOCUMENTS

| | | | |
|---|---|---|---|
| CN | 203545843 U | * | 4/2014 |
| CN | 103964545 A | | 8/2014 |
| CN | 106007209 A | | 10/2016 |
| CN | 104843817 B | | 11/2017 |
| CN | 107512787 A | | 12/2017 |
| CN | 206886920 U | | 1/2018 |
| CN | 108408894 A | | 8/2018 |
| JP | H09173703 A | | 7/1997 |

OTHER PUBLICATIONS

Huang et al, CN 2609631Y, English machine translation, pp. 1-4 (Year: 2004).*
Chen et al, CN 203545843 U, English machine translation, pp. 1-5 (Year: 2014).*
International Search Report in corresponding PCT Patent Application No. PCT/CN2019/078618 dated Aug. 7, 2019.

* cited by examiner

OILY SEWAGE PRETREATMENT METHOD AND DEVICE WITHOUT AIR FLOATATION

CROSS REFERENCE TO RELATED APPLICATIONS

This application is a U.S. National Phase application under 35 U.S.C. 371 of International Application No. PCT/CN2019/078618, filed Mar. 19, 2019, which claims priority to and the benefit of CN Application No. 201811347039.5 filed Nov. 13, 2018, the entire disclosure of each of which is incorporated herein by reference.

TECHNICAL FIELD

The present disclosure pertains to the field of petrochemical industry and environmental protection, and relates to an oily sewage treatment technology. Particularly, the present disclosure relates to an oily sewage treatment method that combines sedimentation separation, hydrocyclone-intensified filtration, and shape coalescence separation. The present disclosure also relates to an oily sewage treatment apparatus.

BACKGROUND ART

Processes for treatment of a large quantity of oily sewage can be found in the petrochemical, environmental protection, and coal chemical industries. There are many types of pollutants in wastewater, including oil, suspended solids, bacteria, dissolved organics, and trace heavy metal elements. At present, a combination of API (American Petroleum Institute) oil separation, flotation and biochemical processes is commonly applied for oily sewage treatment. A pretreatment process is used mainly for removing oil and suspended solids from the oily sewage, and it's a keypoint in the whole sewage treatment process. The quality of the pretreatment process has a direct influence on the treatment effect of the subsequent biochemical unit.

The existing oily sewage pretreatment devices have a number of problems in common. Taking an oily sewage treatment scale of 1000 m$^3$/h for an example, the API oil separation+flotation process consumes the following chemicals: 6080t PAC (polyaluminum chloride) per year, 2800t FeCl$_3$ per year, and 115t PAM (polyacrylamide) per year. So, the chemical consumption is huge, the cost is high, and it is easy to cause secondary pollution. A flotation pool needs to be aerated, and its VOCs (volatile organic compounds) emission may reach 8100 Nm$^3$/h. As the structure of the building is large, VOCs are prone to leakage during the operation. In addition, the flotation scum output from the flotation pool is about 500t per month. As such, a large amount of oily hazardous waste is produced.

With respect to oil and suspended solids, the main pollutants in oily sewage, the treatment methods commonly used currently include, inter alia, gravity sedimentation, centrifugal separation, adsorption, and air flotation. These treatment methods all have their own limitations and are often difficult to achieve the emission requirements when used alone. In response to the gradual upgrade of environmental protection requirements, some processes which couple various methods have been developed, and domestic and foreign researchers have done work in various aspects.

For example, US patent application US20120132588A1 discloses a method for treating oily wastewater, wherein electrochemical flocculation and flotation are used for pretreatment, and membrane distillation is used to treat the pretreated effluent which may be used as raw water to generate steam. However, this method has the problem of large energy consumption.

Chinese patent CN104843817B discloses a method for removing oil by horizontal air flotation with the use of a corrugated plate in combination and an apparatus for the same, wherein an optimized combination of a multi-layer inclined plate unit and a horizontal air flotation process is used to realize three phase separation with high efficiency, rapidity and low energy consumption, suitable for sewage treatment, crude oil exploitation and other oily wastewater treatment processes.

Chinese patent application CN106007209 discloses a pretreatment process for removing oil from oil refining wastewater, wherein a combination of mechanical separation, coarsening treatment and air flotation technology is used for pretreatment to achieve oil-water separation. The invention makes use of physical and chemical co-actions. The oil content in the pretreated oily wastewater is ≤20 mg/L, which meets the national standard. However, there is still the problem of VOCs produced by air flotation.

FIG. 1 shows a flow chart of a traditional treatment process for oily sewage. As shown in FIG. 1, the oily sewage first enters a conditioning tank 1 where primary separation of oil, sludge, and water is achieved. The effluent from the conditioning tank enters an oil separating pool 10 for further separating oil, sludge, and water. The effluent from the oil separating pool enters a flotation pool 11 for removing dispersed oil and suspended particles. The effluent from the flotation pool enters an A/O (anoxic/aerobic) biochemical pool 4 where microorganisms are used to remove organic matter in the sewage. The effluent from the biochemical pool enters a secondary sedimentation pool 12 for further sedimentation. The effluent from the secondary sedimentation pool enters a deep treatment device 5 for further treatment to obtain purified water, wherein the sludge obtained from the treatments in the conditioning tank, the oil separating pool and the flotation pool is delivered to coking device; the VOCs are delivered to a low-pressure gas system; the oil obtained from the treatments in the conditioning tank and the oil separating pool is delivered to an oil recovery system; part of the active sludge settled in the secondary sedimentation pool is returned to the biochemical pool for further treatment, and part of it is delivered to a residual sludge treatment system.

As the existing oily sewage treatment processes are concerned, research on methods for reducing oil content is being deepened uninterruptedly. However, an air flotation process is inevitably used in the treatment. The air flotation process can effectively remove dispersed oil and suspended particles, but addition of chemicals is necessary for removing emulsified oil. In addition, the air flotation process often has such problems as a large amount of floatation scum, and volatilization and leakage of VOCs.

Therefore, there is an urgent need in the art to develop a method and an apparatus that can reduce the emission of VOCs and the quantity of oily sludge in a short process, and overcome the above-mentioned defects of the air flotation process in the prior art.

SUMMARY

The present disclosure provides a novel method and a novel apparatus for pretreatment of oily sewage without air flotation, thereby solving the problems existing in the prior art.

In one aspect, the present disclosure provides a method for pretreatment of oily sewage without air flotation, comprising the following steps:
(a) Sedimentation separation: subjecting oily sewage to sedimentation separation to achieve primary separation of oil, sludge, and water;
(b) Hydrocyclone-intensified filtration: subjecting the oily sewage obtained by the primary separation in Step (a) to hydrocyclone-intensified filtration for the further remove of dispersed oil, sludge and sand from the oily sewage;
(c) Shape coalescence separation: subjecting the oily sewage obtained by Hydrocyclone-intensified filtration in Step (b) to shape coalescence separation to achieve the demulsification, coalescence and separation of emulsified oil; and
(d) Biochemical treatment: delivering the effluent obtained in Step (c) directly to a biochemical system, wherein an air flotation unit is exempted.

In a preferred embodiment, the method further comprises: (e) deep treatment: further treating the effluent obtained by the biochemical treatment in Step (d); and (f) hydrocyclone-intensified filter backwash: backwashing the hydrocyclone-intensified filter at a frequency of not more than one time per week.

In another preferred embodiment, when suspended matter in the oily sewage has a concentration of 5000 mg/L or less, the suspended matter in the oily sewage is removed in Steps (a) and (b), so that the concentration of the suspended matter in the effluent is reduced to 50 mg/L or less.

In another preferred embodiment, when petroleum matter in the oily sewage has a concentration of 20000 mg/L or less, deoiling is effected in Steps (b) and (c), so that the concentration of the petroleum matter is reduced to 20 mg/L or less; wherein a retention time of the oily sewage in Steps (b) and (c) does not exceed 30 minutes in total.

On the other hand, the present disclosure provides an oily sewage pretreatment apparatus that exempts air flotation, wherein the apparatus comprises:
A conditioning tank for sedimentation separation of oily sewage to achieve primary separation of oil, sludge, and water;
A hydrocyclone-intensified filter connected to the conditioning tank for the further remove of dispersed oil, sludge and sand from the oily sewage;
A shape coalescer connected to the hydrocyclone-intensified filter to achieve the demulsification, coalescence and separation of emulsified oil; and
An AOH (anoxic/aerobic/hydrocyclone) biochemical pool connected to the shape coalescer for removing organic matter in the effluent from the shape coalescer, wherein an air flotation unit is exempted.

In a preferred embodiment, the apparatus further comprises a deep treatment device connected to the AOH biochemical pool for further deep treatment of the effluent obtained by the biochemical treatment.

In another preferred embodiment, a filter material having a particle size of 0.5-2 mm is used for a bed packing of the hydrocyclone-intensified filter; one or more hydrocyclone separators are provided on top of the hydrocyclone-intensified filter; and, in the backwash process of the hydrocyclone-intensified filter, the rotation of the particles in the hydrocyclone separators is utilized to intensified the filter material regeneration.

In another preferred embodiment, the shape coalescer comprises a modular internal part comprising hydrophilic-oleophobic fibers and oleophilic-hydrophobic fibers weaved in an X and/or Ω pattern. In another preferred embodiment, the shape coalescer comprises an oil pocket for oil collection, wherein the oil pocket is controlled automatically to discharge oil at intervals.

In another preferred embodiment, the integrated unit of the hydrocyclone-intensified filter and the shape coalescer connected in series has a pressure drop of 0.12 MPa or less, and a footprint that is reduced by about 70% as compared with a traditional API oil separation+flotation process.

Beneficial Effects

The main advantages of the method and apparatus of the invention include:
The invention adopts a process combining sedimentation separation, hydrocyclone-intensified filter and shape coalescence separation to realize removal of oil and suspended solids from oily sewage, and an air flotation unit is exempted. This process effects no addition of chemicals, no air blowing, and no generation of flotation scum, and has the advantages of low cost, simple process, high separation efficiency, etc.

DESCRIPTION OF THE DRAWINGS

The accompanying drawings are provided for further understanding of the disclosure. They constitute a part of the specification only for further explanation of the disclosure without limiting the disclosure.

DETAILED DESCRIPTION

Figure 1:
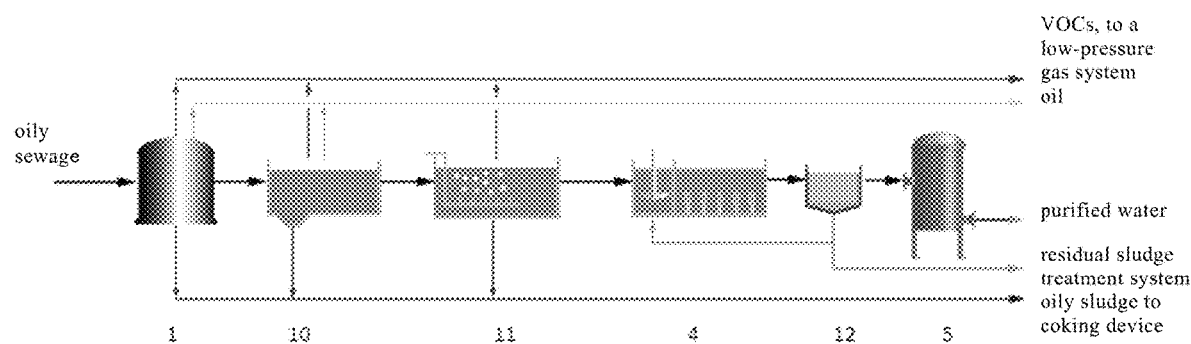
FIG. 1 shows a flow chart of a traditional treatment process for oily sewage.

After extensive and intensive research, the inventors of the present application have discovered that for a mixed system comprising solid phase, water phase, and oil phase, such as oily sewage which entails a large operating flux, the pretreatment methods that are commonly used are processes combining homogenization, API oil separation, and flotation, but these conventional processes have such problems as high complexity in process flow and low flexibility in operation. Therefore, a pretreatment process combining sedimentation separation, hydrocyclone-intensified filter and shape coalescence separation has been invented to remove oil and suspended solids from oily sewage, wherein the sedimentation separation can achieve primary separation of oil, sludge, and water; the hydrocyclone-intensified filter can achieve deep filtration and intensified regeneration of the filter material; the shape coalescer can achieve demulsification, coalescence and separation of emulsified oil; and the effluent from the coalescer enters a biochemical pool directly, wherein an air flotation unit is exempted. Based on the above findings, the present invention has been completed.

In one aspect of the present disclosure, there is provided a method for pretreatment of oily sewage without air flotation, comprising the following steps:
(a) Sedimentation separation: subjecting oily sewage to sedimentation separation in a conditioning tank to achieve primary separation of oil, sludge, and water;
(b) Hydrocyclone-intensified filter: subjecting the oily sewage obtained by the primary separation in Step (a) to hydrocyclone-intensified filtration using a hydrocyclone-intensified filter to further remove dispersed oil, sludge, sand and the like from the oily sewage;

(c) Shape coalescence separation: subjecting the oily sewage obtained by hydrocyclone-intensified filtration in Step (b) to shape coalescence separation using a shape coalescer to achieve demulsification, coalescence and separation of emulsified oil; and (d) Biochemical treatment: delivering the effluent obtained in Step (c) directly to a biochemical system, wherein an air flotation unit is exempted.

In the present disclosure, the method further comprises: (e) deep treatment: further treating the effluent obtained by the biochemical treatment in Step (d) using an AOH biochemical pool.

In the present disclosure, the method further comprises: (f) backwash: backwashing the hydrocyclone-intensified filter at a frequency of not more than one time per week.

In the present disclosure, when suspended matter in the oily sewage has a concentration of 5000 mg/L or less, the suspended matter in the oily sewage can be removed effectively in Steps (a) and (b), so that the concentration of the suspended matter in the effluent is reduced to 50 mg/L or less.

In the present disclosure, when petroleum matter in the oily sewage has a concentration of 20000 mg/L or less, deoiling is effected in Steps (b) and (c), so that the concentration of the petroleum matter is reduced to 20 mg/L or less.

In the present disclosure, a retention time of the oily sewage in Steps (b) and (c) does not exceed 30 minutes in total.

In a second aspect of the present disclosure, there is provided an oily sewage pretreatment apparatus that exempts air flotation, wherein the apparatus comprises:

A conditioning tank for sedimentation separation of oily sewage to achieve primary separation of oil, sludge, and water;

A hydrocyclone-intensified filter connected to the conditioning tank for the further remove of dispersed oil, sludge and sand from the oily sewage;

A shape coalescer connected to the hydrocyclone-intensified filter to achieve the demulsification, coalescence and separation of emulsified oil; and An AOH biochemical pool connected to the shape coalescer for removing organic matter in the effluent from the shape coalescer, wherein an air flotation unit is exempted.

In the present disclosure, the apparatus further comprises a deep treatment device connected to the AOH biochemical pool for further treatment of the effluent obtained by the biochemical treatment.

In the present disclosure, a filter material having a particle size of 0.5-2 mm is used for a bed packing of the hydrocyclone-intensified filter.

In the present disclosure, one or more hydrocyclone separators are provided on top of the hydrocyclone-intensified filter, and in the backwash process of the hydrocyclone-intensified filter, the rotation and revolution of the particles in the hydrocyclone separators are utilized to intensified the filter material regeneration.

In the present disclosure, the shape coalescer comprises a modular internal part comprising hydrophilic-oleophobic fibers and oleophilic-hydrophobic fibers weaved in an X and/or Ω pattern.

In the present disclosure, the shape coalescer comprises an oil pocket for oil collection, wherein the oil pocket is controlled automatically to discharge oil at intervals.

In the present disclosure, the integrated unit of the hydrocyclone-intensified filtration separator and the shape coalescer connected in series has a pressure drop of 0.12 MPa or less, and a footprint that is reduced by about 70% as compared with a traditional API oil separation+flotation process.

Reference will be now made to the accompanying drawings.

Figure 2:
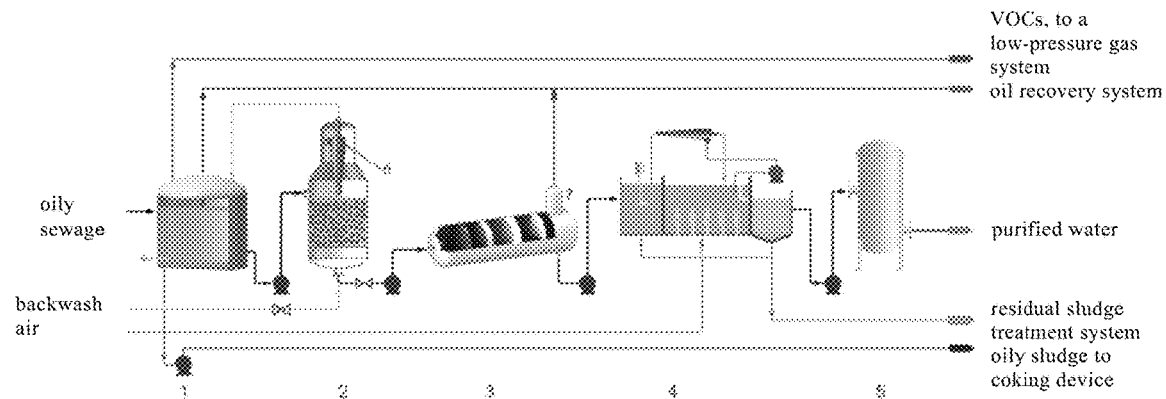
FIG. 2 is a schematic diagram of an oily sewage treatment process according to an embodiment of the present invention.

FIG. 2 is a schematic diagram of an oily sewage treatment process according to an embodiment of the present invention. As shown in FIG. 2, oily sewage first enters a conditioning tank 1 in which primary separation of oil, sludge and water is achieved. The effluent from the conditioning tank enters a hydrocyclone-intensified filter 2 for removing dispersed oil, sludge, sand and the like in the oily sewage. The resulting oily sewage enters a shape coalescer 3 for further treatment to achieve the demulsification, coalescence and separation of emulsified oil (water-in-oil and oil-in-water). The treated wastewater enters the AOH biochemical pool 4 together with air for removing organic matter in the wastewater. The effluent from the AOH biochemical pool enters a deep treatment device 5 for further treatment to obtain purified water. After a period of operation, the backwash of hydrocyclone-intensified filter is necessary. The oily sludge obtained by the treatment in the conditioning tank is delivered to coking device; the VOCs are delivered to a low-pressure gas system; and the oil is delivered to an oil recovery system. One or more hydrocyclone separators 6 are installed on the top of the hydrocyclone-intensified filter, wherein the rotation and revolution of the particles in the hydrocyclone are utilized to achieve intensified regeneration of the filter material during the backwash process of the hydrocyclone-intensified filter. The overflow of the hydrocyclone separators is returned to the conditioning tank for further treatment. The shape coalescer achieves oil-water separation with the use of an oil removal module. The oil is collected in an oil bag 7, and the separated oil is delivered to the oil recovery system. The effluent from the coalescer is further treated in the AOH biochemical pool with the use of activated sludge. Part of the activated sludge settled in the secondary sedimentation pool is returned to the biochemical pool for recycling, and part of it is delivered to a residual sludge treatment system.

EXAMPLES

The invention will be further illustrated with reference to the following specific Examples. It is nevertheless to be appreciated that these Examples are only intended to exemplify the invention without limiting the scope of the invention. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

1. Process Flow

This Example was applied to an oily sewage pretreatment system in the oil refining area of a petrochemical refinery. The previous pretreatment process used by the sewage treatment plant in this base was a combination of homogenization+API oil separation+flotation. The process flow was relatively long, and the arrangement of the corresponding covered buildings had a risk of untight sealing. The water quality conditions of the oily sewage used in this Example are shown in Table 1, and the treatment process flow is shown in FIG. 2.

2. Key Devices

The key devices in this process flow were a hydrocyclone-intensified filter and a shape coalescer. In practical applications, different numbers of devices can be connected in parallel according to different processing capacities. The key process devices are shell-type devices which are convenient for transportation and installation. In this Example, a hydrocyclone-intensified filter was coupled with a shape coalescer to treat petrochemical oily sewage.

3. Running Effect

The water quality conditions of the oily sewage are shown in Table 1 below:

TABLE 1

| Incoming water quality conditions | | | |
|---|---|---|---|
| COD (chemical oxygen demand) (mg/L) | $NH_4$—N (mg/L) | Suspending matter (mg/L) | Petroleum matter (mg/L) |
| 800 | 40 | 50-10000 | 20-20000 |

The pretreatment system was used to conduct continuous experiments on the incoming water. The experimental working conditions included conventional working conditions (oil content being less than 200 mg/L) and shock working conditions (oil content being greater than 1000 mg/L), and the oil contents in the influent and the effluent were measured. The measurement results are shown in Table 2 and Table 3 below.

TABLE 2

| Oil contents in influent and effluent under conventional working conditions | | |
|---|---|---|
| Time | Oil content in influent (mg/L) | Oil content in effluent (mg/L) |
| Day 1 | 98.2 | 33.8 |
| Day 2 | 125 | 28.5 |
| Day 3 | 76.9 | 29.4 |
| Day 4 | 47.2 | 21.3 |
| Day 5 | 44.9 | 25.3 |

TABLE 3

| Oil contents in influent and effluent under shock working conditions | | |
|---|---|---|
| Time | Oil content in influent (mg/L) | Oil content in effluent (mg/L) |
| Day 1 | 15000 | 41.1 |
| Day 2 | 10000 | 42.2 |
| Day 3 | 5000 | 59.1 |
| Day 5 | 10000 | 55.3 |
| Day 6 | 20000 | 65.2 |

As can be seen from the analysis of the water quality of the influent and effluent, the pretreatment system can effectively cope with the shock working conditions of oily sewage. Under the shock working conditions, more than 99% of the oil in the sewage can be recovered, while the volatilization of VOCs is effectively controlled, so that the volatilization of VOCs is reduced from the source. As shown by the experimental results, by sealing the pretreatment process, the leakage and diffusion of at least 60% of the hydrocarbons in the oily sewage in a traditional pretreatment unit are avoided; instead, the hydrocarbons are classified and collected concentratedly. In addition, in this Example, the hydrocyclone-intensified filter can effectively intercept suspended matter which is enriched and recovered by a regeneration process. It's expected that the total amount of sediment can be reduced by 30%, and the process for enrichment and recovery of the sediment also realizes cyclic closed treatment.

The novel pretreatment method of the present invention has a steady effect in removing oil and suspended solids. As can be seen from the measurement results of the concentrations of the petroleum matter in the influent and effluent, the concentration of the oil can be substantially controlled at 30 mg/L or less under conventional working conditions, which means that most of the suspended oil and emulsified oil are removed. The recovery efficiency of the petroleum matter reaches 99% or higher under the shock working conditions, which means that great economic benefits can be achieved. In addition, this pretreatment method can substantially control the concentration of the suspended matter at 50 mg/L or less.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the disclosure can be made by those skilled in the art after reading the above teachings of the disclosure, and these equivalent variations fall in the scope defined by the accompanying claims of the application as well.

What is claimed is:

1. A method for pretreatment of oily sewage without air flotation, comprising the following steps:
    (a) sedimentation separation: subjecting oily sewage to sedimentation separation to achieve primary separation of oil, sludge, and water;
    (b) hydrocyclone-intensified filtration: subjecting the oily sewage obtained by the primary separation in Step (a) to hydrocyclone-intensified filtration to further remove oil, sludge and sand from the oily sewage;
    (c) shape coalescence separation: subjecting the oily sewage obtained by hydrocyclone-intensified filtration in Step (b) to shape coalescence separation to achieve the demulsification, coalescence and separation of emulsified oil from an effluent; and
    (d) biochemical treatment: delivering the effluent obtained in Step (c) directly to a biochemical system, wherein an air flotation unit is exempted.

2. The method of claim 1, wherein the method further comprises: (e) further treating the effluent obtained by the biochemical treatment in Step (d) to obtain purified water; and (f) backwash: backwashing the hydrocyclone-intensified filter at a frequency of not more than one time per week.

3. The method of claim 1, wherein when suspended matter in the oily sewage has a concentration of 5000 mg/L or less, Steps (a) and (b) each further comprise removing the suspended matter in the oily sewage, so that the concentration of the suspended matter in the effluent is reduced to 50 mg/L or less.

4. The method of claim 1, wherein when petroleum matter in the oily sewage has a concentration of 20000 mg/L or less, Steps (b) and (c) each further comprise a step of deoiling, so that the concentration of the petroleum matter is reduced to 20 mg/L or less; wherein a retention time of the oily sewage in Steps (b) and (c) does not exceed 30 minutes in total.

5. An oily sewage pretreatment apparatus that exempts air flotation, wherein the apparatus comprises:
- a conditioning tank (1) for sedimentation separation of oily sewage to achieve primary separation of oil, sludge, and water;
- a hydrocyclone-intensified filter (2) connected to the conditioning tank (1) for the further removal of oil, sludge and sand from the oily sewage;
- a shape coalescer (3) connected to the hydrocyclone-intensified filter (2) to achieve demulsification, coalescence and separation of emulsified oil from an effluent; and
- an anoxic/aerobic/hydrocylclone (AOH) biochemical pool (4) connected to the shape coalescer (3) for removing organic matter in the effluent from the shape coalescer, wherein an air flotation unit is exempted.

6. The apparatus of claim 5, wherein the apparatus further comprises a treatment device (5) connected to the AOH biochemical pool (4) for further treatment of the effluent from the biochemical pool to obtain purified water.

7. The apparatus of claim 5, wherein a filter material having a particle size of 0.5-2 mm is used for a bed packing of the hydrocyclone-intensified filter (2); and one or more hydrocyclone separators (6) are provided on top of the hydrocyclone-intensified filter (2).

8. The apparatus of claim 5, wherein the shape coalescer (3) comprises a modular internal part comprising hydrophilic-oleophobic fibers and oleophilic-hydrophobic fibers weaved in an X and/or Q pattern.

9. The apparatus of claim 5, wherein the shape coalescer (3) comprises an oil pocket (7) for oil collection.

10. The apparatus of claim 5, wherein the hydrocyclone-intensified filtration separator (2) and the shape coalescer (3) connected in series has a pressure drop of 0.12 MPa or less, and a footprint that is reduced by 70% as compared with a traditional API oil separation+flotation process.

* * * * *